United States Patent Office 2,940,980
Patented June 14, 1960

2,940,980

5-ACYLIMINO-N-ALKYL-4-ALKYL-Δ²-1,3,4-THIADIAZOLINE-2-SULFONAMIDES

Rocco Joseph Lopresti, Brooklyn, N.Y.; Sidney Robert Safir, River Edge, N.J.; Richard William Young, Riverside, Conn.; and Charles Edward Rauh, Bogota, N.J., assignors to American Cyanamid Company, New York, N.Y., a corporation of Maine No Drawing. Filed Dec. 8, 1958, Ser. No. 778,619

8 Claims. (Cl. 260—306.7)

This invention relates to novel organic compounds and more particularly is concerned with novel 5-acylimino-N - alkyl - 4 - alkyl - Δ² - 1,3,4 - thiadiazoline - 2 - sulfonamides which may be represented by the following general formula:

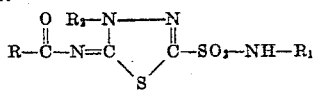

wherein R is hydrogen or lower alkyl and $R_1$ and $R_2$ are lower alkyl. Suitable lower alkyl substituents are methyl, ethyl, propyl, isopropyl, butyl, amyl, hexyl, etc.

The compounds of this invention are useful pharmaceuticals. It has been discovered that these compounds possess desirable pharmacological properties and in particular are capable of producing pronounced anaesthesia of short duration upon intravenous administration in man and animals with minimal side effects. The dosage required to produce surgical anaesthesia of from 10 to 60 minutes duration without noticeable toxic side effects varies between 10 milligrams and 200 milligrams per kilogram of body weight.

The compounds are related to the heterocyclic sulfonamides described in the patent to Richard W. Young et al., No. 2,783,241, which are useful carbonic anhydrase inhibitors. The new compounds herein may be considered to be alkyl derivatives of methazolamide described in this patent in that the sulfonamide radical of the parent compound is substituted by a lower alkyl group. Unexpectedly, however, this substitution produces a striking change in the activity of the resulting compounds. The new compounds unexpectedly produce a state of general anaesthesia. Methazolamide exhibits no anaesthetic properties even in large dosages when similarly administered.

The compounds may be prepared by reacting a 5-acetylimino-4-alkyl-Δ²-1,3,4-thiadiazoline-2-sulfonyl chloride with an appropriate amine in the presence of a suitable non-hydroxylated organic solvent such as benzene, toluene, etc. The reaction may be carried out at temperatures ranging from about 15° C. to about 40° C. The resulting 5 - acetylimino - N - alkyl - 4 - alkyl - Δ² - 1,3,4-thiadiazoline-2- sulfonamide may then be treated to form the corresponding N-alkyl-5-imino-4-alkyl-Δ²-1,3,4-thiadiazoline-2-sulfonamide hydrochloride by treatment with hydrochloric acid in ethanol. This reaction is usually carried out at the reflux temperature of the solvent employed. The resulting compound may then be reacted with a mixture of a lower alkanoyl anhydride, i.e. butyric anhydride, propionic anhydride, etc., and its corresponding acid, i.e. butyric acid, propionic acid, etc., at temperatures between about 70° C. to 115° C. so as to form the corresponding 5 - acylimino - N - alkyl - 4 - alkyl - Δ² - 1,3,4 - thiadiazoline-2-sulfonamide.

The above reaction is illustrated schematically below:

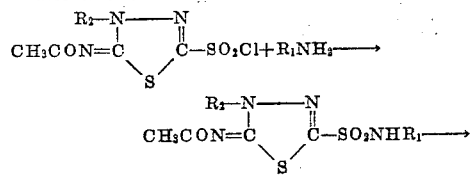

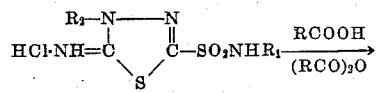

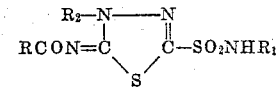

wherein R, $R_1$ and $R_2$ are lower alkyl radicals.

Alternatively, the N - alkyl - 5 - imino-4-alkyl-Δ²-1,3,4-thiadiazoline-2-sulfonamide hydrochloride prepared as above-described may be treated with an excess of gaseous ammonia for a period from about 5 minutes to 1 hour to form the corresponding N-alkyl-5-imino-4-alkyl-Δ²-1,3,4-thiadiazoline-2-sulfonamide. This product may then be reacted with formic acid in the presence of a lower alkanoic anhydride such as acetic anhydride, butyric anhydride, etc. to form the corresponding 4-alkyl-5-formylimino - N - alkyl - Δ² - 1,3,4-thiadiazoline-2-sulfonamide. This series of reactions may be illustrated by the following equation wherein $R_1$ and $R_2$ are lower alkyl radicals.

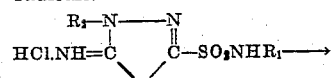

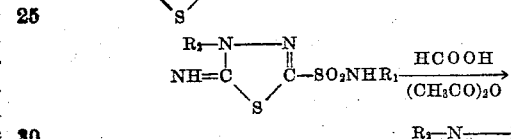

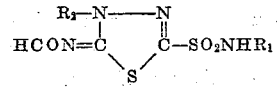

The invention will be described in greater detail in conjunction with the following specific examples.

EXAMPLE 1

*Preparation of 5-acetylimino-N-sec. butyl-4-methyl Δ²-1,3,4-thiadiazoline-2-sulfonamide*

To a solution of 25.3 g. of sec. butylamine dissolved in 300 ml. of benzene there was added 44.4 g. of 5-acetylimino-4-methyl-Δ²-1,3,4-thiadiazoline-2-sulfonyl chloride. The reaction mixture was concentrated to give a solid which was suspended in 200 ml. of hot water. The mixture was filtered and recrystallization of the insoluble material from ethyl alcohol yielded 5-acetylimino-N-sec. butyl-4-methyl-Δ²-1,3,4-thiadiazoline-2-sulfonamide; M.P. 167.5–169°.

EXAMPLES 2–12

The following compounds were prepared by reacting 5 - acetylimino-4-methyl-Δ²-1,3,4-thiadiazoline-2-sulfonyl chloride with the appropriate amine as described in Example 1.

| Example No. | $R_1$ | $R_2$ | M.P., ° C. |
|---|---|---|---|
| 2 | $CH_3$— | $CH_3$— | 163–164.5 |
| 3 | $CH_3CH_2$— | $CH_3$— | 154–155 |
| 4 | $CH_3CH_2CH_2$— | $CH_3$— | 143–144 |
| 5 | $(CH_3)_2CH$— | $CH_3$— | 200–201.5 |
| 6 | $CH_3CH_2CH_2CH_2$— | $CH_3$— | 145.5–146.5 |
| 7 | $(CH_3)_3C$— | $CH_3$— | 173–174 |
| 8 | $CH_2=C(CH_3)CH_2$— | $CH_3$— | 137–138 |
| 9 | $CH_3(CH_2)_3CH_2$— | $CH_3$— | 106–109 |
| 10 | $(CH_3)_2CHCH_2CH_2$— | $CH_3$— | 127–130 |
| 11 | $CH_3(CH_2)_4CH_2$— | $CH_3$— | 120–121 |
| 12 | $(CH_3)_2CHCH_2$ | $CH_3$— | 136.5–137.5 |

EXAMPLE 13

*Preparation of N-propyl-5-imino-4-methyl-Δ²-1,3,4-thiadiazoline-2-sulfonamide hydrochloride*

A solution of 24.1 g. of 5-acetylimino-4-methyl-N-propyl-Δ²-1,3,4-thiadiazoline-2-sulfonamide in 439 cc. of dry ethanol and 44 cc. of 12 N hydrochloric acid was refluxed for 1¼ hours. Upon cooling in ice, a colorless solid crystallized and was filtered; M.P. 203–207° (dec.).

EXAMPLE 14

*Preparation of N-tert. butyl-5-imino-4-methyl-$\Delta^2$-1,3,4-thiadiazoline-2-sulfonamide hydrochloride*

The procedure of the preceding example was repeated except that an equivalent quantity of 5-acetylimino-4-methyl-N-tert. butyl-$\Delta^2$-1,3,4-thiadiazoline-2-sulfonamide was used. N-tert. butyl-5-imino-4-methyl-$\Delta^2$-1,3,4-thiadiazoline-2-sulfonamide hydrochloride having a melting point of 215–219° (dec.) was obtained.

EXAMPLE 15

*Preparation of N-sec. butyl-5-imino-4-methyl-$\Delta^2$-1,3,4-thiadiazoline-2-sulfonamide hydrochloride*

The procedure of Example 13 was repeated except that an equivalent quantity of 5-acetylimino-4-methyl-N-sec. butyl-$\Delta^2$-1,3,4-thiadiazoline-2-sulfonamide was used. N-sec. butyl-5-imino-4-methyl-$\Delta^2$-1,3,4-thiadiazoline-2-sulfonamide hydrochloride having a melting point of 198–201° (dec.) was obtained.

EXAMPLE 16

*Preparation of N-isobutyl-5-imino-4-methyl-$\Delta^2$-1,3,4-thiadiazoline-2-sulfonamide hydrochloride*

The procedure of Example 13 was repeated except that an equivalent quantity of 5-acetylimino-4-methyl-N-isobutyl-$\Delta^2$-1,3,4-thiadiazoline-2-sulfonamide was used. N-isobutyl-5-imino-4-methyl-$\Delta^2$-1,3,4-thiadiazoline-2-sulfonamide hydrochloride having a melting point of 211–214° (dec.) was obtained

EXAMPLE 17

*Preparation of N-sec. butyl-5-butyrylimino-4-methyl-$\Delta^2$-1,3,4-thiadiazoline-2-sulfonamide*

A mixture of 8 g. of N-sec. butyl-5-imino-4-methyl-$\Delta^2$-1,3,4-thiadiazoline-2-sulfonamide hydrochloride, 17.7 g. of butyric anhydride and 35 ml. of butyric acid was heated for 1¼ hours at 110–115°. The reaction was cooled in an ice-bath and then diluted with petroleum-ether. The mixture was filtered and the insoluble material was first washed with water and then recrystallized from 50% alcohol to give N-sec. butyl-5-butyrylimino-4-methyl-$\Delta^2$-1,3,4-thiadiazoline-2-sulfonamide; M.P. 112–112.5°.

EXAMPLES 18–31

The following compounds were prepared by reacting the appropriate 5-imino-N-alkyl-4-methyl-$\Delta^2$-1,3,4-thiadiazoline-2-sulfonamide hydrochloride with the appropriate alkanoic anhydride, as described in Example 17.

| Example No. | R | $R_1$ | $R_2$ | M.P., °C. |
|---|---|---|---|---|
| 18 | $CH_3CH_2-$ | $CH_3CH_2CH_2-$ | $CH_3-$ | 94–95 |
| 19 | $CH_3CH_2CH_2-$ | $CH_3CH_2CH_2-$ | $CH_3-$ | 106–107 |
| 20 | $CH_3(CH_2)_3-$ | $CH_3CH_2CH_2-$ | $CH_3-$ | 81–82 |
| 21 | $CH_3(CH_2)_4-$ | $CH_3CH_2CH_2-$ | $CH_3-$ | 115–116 |
| 22 | $CH_3CH_2-$ | $(CH_3)_3C-$ | $CH_3-$ | 152.5–154 |
| 23 | $CH_3CH_2CH_2-$ | $(CH_3)_3C-$ | $CH_3-$ | 116–117 |
| 24 | $CH_3(CH_2)_3-$ | $(CH_3)_3C-$ | $CH_3-$ | 115–116 |
| 25 | $CH_3(CH_2)_4-$ | $(CH_3)_3C-$ | $CH_3-$ | 119–120 |
| 26 | $CH_3CH_2-$ | $C_2H_5CH(CH_3)-$ | $CH_3-$ | 138.5–140 |
| 27 | $CH_3(CH_2)_3-$ | $C_2H_5CH(CH_3)-$ | $CH_3-$ | 108–109 |
| 28 | $CH_3(CH_2)_4-$ | $C_2H_5CH(CH_3)-$ | $CH_3-$ | 101–102 |
| 29 | $CH_3CH_2CH_2-$ | $C_2H_5CH(CH_3)-$ | $CH_3-$ | 112–112.5 |
| 30 | $CH_3CH_2-$ | $(CH_3)_2CHCH_2-$ | $CH_3-$ | 88.5–90 |
| 31 | $CH_3CH_2CH_2-$ | $(CH_3)_2CHCH_2-$ | $CH_3-$ | 99–100.5 |

EXAMPLE 32

*Preparation of 5-acetylimino-4-ethyl-N-propyl-$\Delta^2$-1,3,4-thiadiazoline-2-sulfonamide*

To a solution of 25.8 g. of propylamine and 750 ml. of benzene, there was added in the cold 41.2 g. of 5-acetylimino-4-ethyl-$\Delta^2$-1,3,4-thiadiazoline-2-sulfonyl chloride. The reaction was permitted to stand at room temperature for 2 hours and was then concentrated in vacuo to yield a solid, which was suspended in 200 ml. of hot water. The mixture was filtered and the insoluble material was recrystallized from methanol to yield 5-acetylimino-4-ethyl-N-propyl-$\Delta^2$-1,3,4-thiadiazoline-2-sulfonamide; M.P. 130–131.5°.

EXAMPLE 33

*Preparation of 5-acetylimino-N-tert. butyl-4-ethyl-$\Delta^2$-1,3,4-thiadiazoline-2-sulfonamide*

The procedure of Example 32 was repeated except that an equivalent quantity of tert. butylamine was used. 5-acetylimino-N-tert. butyl-4-ethyl-$\Delta^2$-1,3,4-thiadiazoline-2-sulfonamide having a melting point of 151.5–153° was obtained.

EXAMPLE 34

*Preparation of N-propyl-4-ethyl-5-imino-$\Delta^2$-1,3,4-thiadiazoline-2-sulfonamide hydrochloride*

A solution of 25.8 g. of 5-acetylimino-4-ethyl-N-propyl-$\Delta^2$-1,3,4-thiadiazoline-2-sulfonamide in 500 cc. of dry ethanol and 50 cc. of 12 N hydrochloric acid was refluxed for 1¼ hours. Upon cooling in ice a colorless solid crystallized and was filtered; M. P. 167–169° (dec.).

EXAMPLE 35

*Preparation of N-tert. butyl-4-ethyl-5-imino-$\Delta^2$-1,3,4-thiadiazoline-2-sulfonamide hydrochloride*

The procedure of the preceding example was repeated except that 5-acetylimino-4-ethyl-N-tert. butyl-$\Delta^2$-1,3,4-thiadiazoline-2-sulfonamide was used. N-tert. butyl-4-ethyl-5-imino-$\Delta^2$-1,3,4-thiadiazoline-2-sulfonamide hydrochloride having a melting point of 143–150° (dec.) was obtained.

EXAMPLE 36

*Preparation of 4-ethyl-5-propionylimino-N-propyl-$\Delta^2$-1,3,4-thiadiazoline-2-sulfonamide*

A mixture of 2.9 g. of 4-ethyl-5-imino-N-propyl-$\Delta^2$-1,3,4-thiadiazoline-2-sulfonamide hydrochloride, 5.3 g. of propionic anhydride and 15 ml. of propionic acid was heated at 110–115° for 1¼ hours. The solution was cooled and then diluted with petroleum-ether. The resulting mixture was filtered and the insoluble material was first washed with water and then recrystallized from alcohol-petroleum ether to give 4-ethyl-5-propionylimino-N-propyl-$\Delta^2$-1,3,4-thiadiazoline-2-sulfonamide; M.P. 83.5–85°.

EXAMPLE 37

*Preparation of 5-butyrylimino-4-ethyl-N-propyl-$\Delta^2$-1,3,4-thiadiazoline-2-sulfonamide*

The procedure of Example 36 was repeated using an equivalent quantity of butyric anhydride and butyric acid. The resulting 5-butyrylimino-4-ethyl-N-propyl-$\Delta^2$-1,3,4-thiadiazoline-2-sulfonamide had a melting point of 84–85° C.

EXAMPLE 38

*Preparation of 4-ethyl-N-propyl-5-valerylimino-$\Delta^2$-1,3,4-thiadiazoline-2-sulfonamide*

The procedure of Example 36 was repeated using an equivalent quantity of valeric anhydride and valeric acid. 4-ethyl-N-propyl-5-valerylimino-$\Delta^2$-1,3,4-thiadiazoline-2-sulfonamide having a melting point of 80–81° C. was obtained.

EXAMPLE 39

*Preparation of N-tert. butyl-5-butyrylimino-4-ethyl-$\Delta^2$-1,3,4-thiadiazoline-2-sulfonamide*

The procedure of Example 36 was repeated using an equivalent amount of butyric anhydride, butyric acid, and 4-ethyl-5-imino-N-tert. butyl-$\Delta^2$-1,3,4-thiadiazoline-2-sulfonamide hydrochloride. The resulting compound had a melting point of 119–120° C.

EXAMPLE 40

*Preparation of N-tert. butyl-4-ethyl-5-imino-$\Delta^2$-1,3,4-thiadiazoline-2-sulfonamide*

To a suspension of N-tert. butyl-4-ethyl-5-imino-$\Delta^2$-1,3,4-thiadiazoline-2-sulfonamide hydrochloride in 75 cc. of chloroform at 25°, there was introduced an excess of gaseous ammonia. The mixture was filtered and the filtrate was evaporated to dryness in vacuo to yield a crude solid which was recrystallized from ethanol-petroleum ether to give a light yellow solid, M.P. 131–135° (dec.).

EXAMPLE 41

*Preparation of N-isobutyl - 4 - methyl-5-imino-$\Delta^2$-1,3,4-thiadiazoline-2-sulfonamide*

The procedure of Example 40 was repeated using N-isobutyl-4-methyl - 5 - imino-$\Delta^2$-1,3,4-thiadiazoline-2-sulfonamide hydrochloride. The resulting N-isobutyl-4-methyl-5-imino-$\Delta^2$-1,3,4-thiadiazoline-2-sulfonamide had a melting point of 87–92° C.

EXAMPLE 42

*Preparation of N-propyl-4-ethyl-5-imino-$\Delta^2$-1,3,4-thiadiazoline-2-sulfonamide*

The procedure of Example 40 was repeated using N-propyl-4-ethyl - 5 - imino-$\Delta^2$-1,3,4-thiadiazoline-2-sulfonamide hydrochloride. The resulting N-propyl-4-ethyl-5-imino-$\Delta^2$-1,3,4-thiadiazoline - 2 - sulfonamide was obtained as a yellow oil.

EXAMPLE 43

*Preparation of 4-ethyl-5-formylimino-N-propyl-$\Delta^2$-1,3,4-thiadiazoline-2-sulfonamide*

A solution of 1 g. of 4-ethyl-5-imino-N-propyl-$\Delta^2$-1,3,4-thiadiazoline-2-sulfonamide, 6 ml. of formic acid 2.2 ml. of acetic anhydride was refluxed for 1¼ hours. The solution was poured into ice-water and crystallization took place. The mixture was filtered and the insoluble material was recrystallized from alcohol-petroleum ether to yield a product melting at 115–117° C.

EXAMPLE 44

*Preparation of 4-ethyl-5-formylimino-N-tert. butyl-$\Delta^2$-1,3,4-thiadiazoline-2-sulfonamide*

The procedure of Example 43 was repeated using 4-ethyl-5-imino-N-tert. butyl-$\Delta^2$-1,3,4-thiadiazoline - 2 - sulfonamide. The resulting 4-ethyl-5-formylimino-N-tert. butyl-$\Delta^2$-1,3,4-thiadiazoline-2-sulfonamide had a melting point of 122–124° C.

EXAMPLE 45

*Preparation of 4-methyl-5-formylimino-N-isobutyl-$\Delta^2$-1,3,4-thiadiazoline-2-sulfonamide*

The procedure of Example 43 was repeated using 4-methyl-5-imino - N - isobutyl - $\Delta^2$ - 1,3,4 - thiadiazoline-2-sulfonamide. The resulting 4-methyl-5-formylimino-N-isobutyl-$\Delta^2$-1,3,4-thiadiazoline-2-sulfonamide had a melting point of 110–112° C.

We claim:

1. 5-acylimino-N-alkyl-4-alkyl-$\Delta^2$-1,3,4 - thiadiazoline-2-sulfonamides of the formula:

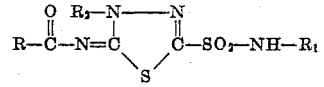

wherein R is selected from the group consisting of hydrogen and lower alkyl and $R_1$ and $R_2$ are lower alkyl radicals.

2. 5-propionylimino-N-propyl - 4 - ethyl - $\Delta^2$-1,3,4 - thiadiazoline-2-sulfonamide.

3. 5-acetylimino-N - propyl-4 - methyl - $\Delta^2$-1,3,4 - thiadiazoline-2-sulfonamide.

4. 5-butyrylimino-N-sec. butyl-4-methyl-$\Delta^2$-1,3,4-thiadiazoline-2-sulfonamide.

5. 5-propionylimino-N-tert. butyl - 4-ethyl-$\Delta^2$-1,3,4-thiadiazoline-2-sulfonamide.

6. 5 - acetylimino-N-isopropyl-4-methyl-$\Delta^2$-1,3,4-thiadiazoline-2-sulfonamide.

7. 5-propionylimino-N-isobutyl-4 - methyl-$\Delta^2$-1,3,4-thiadiazoline-2-sulfonamide.

8. A method of preparing 5-acylimino-N-alkyl-4-alkyl-$\Delta^2$-1,3,4-thiadiazoline-2-sulfonamides of the formula:

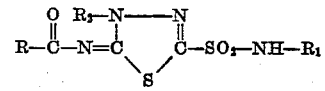

wherein R is selected from the group consisting of hydrogen and lower alkyl and $R_1$ and $R_2$ are lower alkyl radicals which comprises reacting the corresponding 5-acylimino-N-alkyl-4-alkyl-$\Delta^2$-1,3,4 - thiadiazoline - 2-sulfonyl chloride with a lower alkyl amine.

References Cited in the file of this patent
UNITED STATES PATENTS 2,783,239    Young et al. _____ Feb. 26, 1957